Sept. 30, 1947.  L. L. JOHNSON  2,428,332
APPARATUS FOR AND METHOD OF STARTING AN
ELECTRIC VALVE CONVERTING SYSTEM
Filed Oct. 12, 1944   3 Sheets-Sheet 2

Inventor
Lauren L. Johnson
by Didier Journeaux
Attorney

Patented Sept. 30, 1947

2,428,332

UNITED STATES PATENT OFFICE 2,428,332

APPARATUS FOR AND METHOD OF STARTING AN ELECTRIC VALVE CONVERTING SYSTEM

Lauren L. Johnson, Milwaukee, Wis., assignor to Allis-Chalmers Manufacturing Company, Milwaukee, Wis., a corporation of Delaware Application October 12, 1944, Serial No. 558,428

29 Claims. (Cl. 172—281)

1

This invention relates in general to improvements in electric valve control systems and more particularly to means for initiating the flow of high frequency alternating current through a load circuit energized from a low frequency alternating circuit through a converting system comprising a plurality of electric valves of the discontinuously controllable type.

When high frequency current is supplied to a load circuit from a converting system comprising discontinuously controllable electric valves the flow of current through the different valves is periodically commutated by suitable means, preferably by the action of the energy stored in the load circuit as directed by suitable control of the conductivity of the valves. When the operation of the system is being initiated, however, there is no energy stored in the load circuit unless it is already connected to a generator or to another converter. The starting operation of the system therefore requires preliminary supplying of sufficient stored energy to the load circuit to produce commutation of the valve currents.

When the load circuit is of capacitive character, this result is preferably obtained by causing the flow through the valves of current impulses resulting in the flow of transient currents of a suitable order of magnitude through the load circuit. In this manner the capacitive elements of the load circuit are periodically charged and discharged to insure both the desired current commutation between the valves and the impression of suitable potential impulses on the control electrodes of the valves for controlling the commutation.

In preferred embodiments of the invention, pulsating valve currents of suitable magnitude and wave form are obtained by controlling the conductivity of the valves in accordance with the instantaneous value of the valve currents at least until commutation has been established. The conductivity of the valves may be established at a high value for the initiation of the operation of the converter and may be thereafter reduced to a value insuring trouble-free continuous operation of the converter under various load conditions. The conductivity of the valves is also preferably so controlled as to impart to the converter a rising volt-ampere characteristic to meet the usual operating requirements of heating circuits supplying current for induction heating of metals.

If it is found necessary to maintain the temperature of the valves above ambient temperature while the converter is out of operation, current may be caused to flow from the supply circuit through an intermediate circuit of the converter including the valves to the exclusion of the load circuit, the means of controlling the conductivity of the valves for the flow of heating

2 current therethrough and those for controlling the transfer of current to the load circuit being preferably interlocked to prevent simultaneous operation thereof.

It is therefore an object of the present invention to provide a control system for an electric valve converter supplying current to an alternating current load circuit whereby pulsating currents are established through the valves for initiating normal operation of the converter.

Another object of the present invention is to provide a control system for an electric valve converter for supplying current to an alternating current load circuit whereby the conductivity of the valves is controlled in response to the valve currents at least until normal operation of the converter is established.

Another object of the present invention is to provide a control system for an electric valve converter for supplying current to a load circuit in which the conductivity of the valves is decreased in response to energization of the load circuit.

Another object of the present invention is to provide a control system for an electric valve converter supplying current to an alternating current load circuit whereby the converter is imparted a rising volt-ampere characteristic.

Another object of the present invention is to provide a control system for an electric valve converter for supplying current to an alternating current load circuit whereby the valves of the converter are maintained at operating temperature while the converter is out of operation.

Another object of the present invention is to provide a control system for an electric valve converter for supplying current to an alternating current load circuit whereby operation of the converter is initiated in response to loading of the load circuit.

Objects and advantages other than those above set forth will be apparent from the following description when read in connection with the accompanying drawing, in which.

Figure 1:
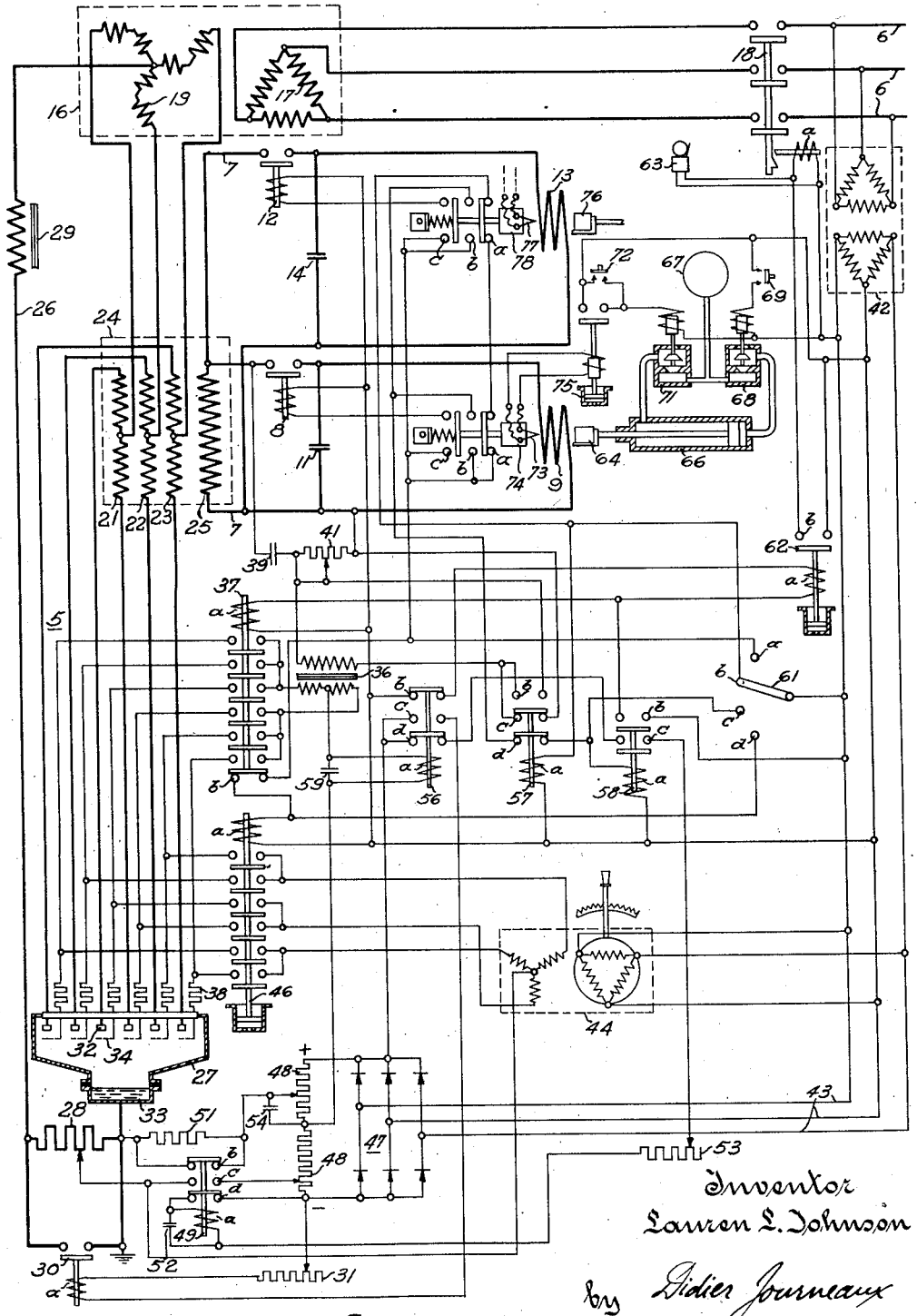
Fig. 1 is a connection diagram of one embodiment of the present invention applied to one type of valve converter automatically operable for supplying a plurality of coils for heating objects by induction and utilizing the current rectified by the valves for energizing the control electrodes of the valves.

Referring more particularly to the drawing by characters of reference, Fig. 1 diagrammatically illustrates a converter 5 for supplying alternating current of relatively high frequency to a single-phase load circuit 7 from a three-phase supply circuit 6 energized from any suitable generator (not shown) operating at a relatively low frequency. It will be understood however that circuits 6 and 7 may be of any numbers of phases and may operate at any desired frequencies according to the current source available and the type of heating load to be connected to circuit 7. Circuit 7 is assumed to be connected through a load switch 8 with an inductor coil 9 and a capacitor 11, and to be similarly connected through a load switch 12 with an inductor coil 13 and a capacitor 14. The number of coils and of capacitors may be greater than two but each capacitor is of sufficient size to overbalance the inductance of the associated inductor coil so that circuit 7 assumes a capacitive character upon closure of a load switch or of any pluraltiy of load switches.

Converter 5 comprises an input or low frequency transformer 16 having a primary winding 17 divided into a plurality of phase portions severally connected with the different conductors of circuit 6 through a switch 18. The secondary winding 19 of transformer 16 is divided into a plurality of phase portions defining a neutral point and so arranged as to substantially preclude dissymmetrical magnetization of the transformer core upon flow of unidirectional currents through the winding.

The terminals of winding 19 are severally connected with the midtaps of primary windings 21, 22 and 23 of an output or high frequency transformer 24 having a secondary winding 25 connected with load circuit 7. The terminals of windings 21, 22 and 23 are connected with the neutral point of winding 19 through a plurality of electric valves 27 of the discontinuously controllable type, an optional resistor 28 and a reactor 29 to complete an intermediate circuit 26 inductively connected with circuits 6 and 7 for the transfer of energy therebetween through windings 17 and 25, respectively. A switch 30, the operation of which may be controlled by a variable resistor 31, serves to short circuit resistor 28 when starting of the converter is completed, but is omitted when circuit 26 is not provided with a resistor.

Valves 27 are provided with anodes 32, which may be assembled each with the associated cathode in a separate casing, or which may all be arranged in a common casing provided with a common cathode 33. The cathode is provided with the usual means (not shown) for initiating and maintaining the emission of electrons thereat. The conductivity of the valves is controlled by means of suitable control electrodes 34 which may be grids when the continuously emissive type of cathode is provided. Grids 34 also serve to control the density of ionization in the space adjacent anodes 32 during the idling periods thereof to prevent failure of the valve action of the anodes. Although only one grid is shown associated with each anode 32, it will be understood that additional grids may be provided, the grids being suitably arranged, dimensioned and energized for further reducing the density of ionization in the vicinity of the anodes. Valves 27, if necessary, may also be provided with suitable external and internal water cooled elements (not shown) for reducing the vapor density within the casing and thereby assist in controlling the density of ionization.

Grids 34 may be energized in two groups of three from a transformer 36 through contacts of a relay 37 and through current limiting resistors 38 of sufficiently low resistance to offer relatively little opposition to the flow of so-called inverse current therethrough resulting from the deionizing action of the grids. Transformer 36 is energized from circuit 7 through a phase shifting circuit comprising a capacitor 39 and an adjustable resistor 41. Grids 34 may alternately be energized in pairs from circuit 6 through a transformer 42, a control circuit 43, a phase shifter 44 and contacts of a time delay relay 46.

A rectifier 47 of any suitable type energized from circuit 43 supplies current to a voltage divider 48. Unidirectional potential components may be impressed on grids 34 from voltage divider 48 and from resistor 28 under the control of a relay 49 cooperating with a resistor 51. The flow of current through the coil 49a of relay 49 is controlled by a capacitor 52 and an adjustable resistor 53. A filter capacitor 54 is connected in parallel with a portion of voltage divider 48.

The starting operation of converter 5 is controlled by means of a plurality of relays 56, 57, 58. The coil 56a of relay 56 is energized by the rectified current of grids 34 during normal operation of the converter and is bridged by a filtering capacitor 59. Different operating conditions of the system may be selected by means of a selector switch 61. A timing relay 62, which is shown conventionally as a dashpot delayed solenoid relay but which may be of any suitable known type, is controlled by the other elements of the system to connect the trip coil 18a of switch 18 and an alarm device 63 with circuit 43 in response to failure of the starting operation of the converter.

Coil 9 is adapted to serve as a heating device for an electrically conductive object such as a billet 64 by induction of electric current therein upon movement of the billet into inductive relation with the coil. The billet may be arranged to be moved in and out of inductive relation with coil 9 by means of any suitable actuator such as a fluid actuated reciprocating motor 66 also serving as a support for the billet. The motor may be connected with a source of fluid under pressure such as a reservoir 67 by means of a magnet valve 68 to cause billet 64 to be placed within coil 9 in heating relation therewith. The coil of magnet valve 68 may be energized from circuit 43 through a push-button switch 69. Motor 66 may also be connected with reservoir 67 through a second magnet valve 71 to withdraw billet 64 out of inductive relation with coil 9. The coil of magnet valve 71 may be energized from circuit 43 through a push button switch 72.

The relative position of billet 64 and of coil 9 may be controlled in response to the temperature of the billet. More particularly, operation of magnet valve 71 may be controlled in response to the temperature of billet 64 by means of a rigid thermocouple 73 mounted on a yieldable contact making device or relay 74 in such manner that the relay is actuated and the thermocouple is urged into contact with billet 64 in response to the billet being placed in heating position within coil 9. The thermocouple is associated with any suitable known means conventionally represented as a dashpot retarded solenoid relay 75 to cause actuation of magnet valve 71 when the temperature of billet 64 reaches the value for which relay 75 is adjusted and thereby cause relative movement of billet 64 and coil 9 out of inductive relation.

Coil 13 is similarly arranged for effecting the heating of a billet 76 simultaneously with the heating of billet 64 in coil 9 and is associated with a rigid thermocouple 77 mounted on a relay 78. The contacts of relays 74 and 78 and of any other similar relay associated with other inductor coils to be energized from circuit 7 cooperate to control the connection of circuit 7 with the coils and the starting and stopping of converter 5 in response to loading and unloading of circuit 7 by movement of the billets in and out of inductive relation with the inductor coils. It will be understood that the relays may be actuated by the inductor coils if the billets are stationary and the coils are moved instead for relative movement of the billets and the coils in and out of inductive heating relation.

In operation, the elements of the system being in the position shown, energization of circuit 6 causes the supply of current therefrom to coil 57a through transformer 42, circuit 43 and switch 61. Relay 57 operates but such operation is without effect on the operation of the system. Cathode 33 is rendered emissive and is maintained in emissive condition by means of an auxiliary arc as is well known.

Automatic operation of the system is initiated by moving switch 61 into engagement with contact 61a. Current then flows from circuit 43 through switch 61, contact 61a, contacts 74a, contacts 78a, coil 57a, back to circuit 43 to maintain relay 57 in operated position. Current also flows from circuit 43 through switch 61, contact 61a, contacts 37b and coil 46a back to circuit 43, and relay 46 closes its contacts after a predetermined time delay. Current is thereby caused to flow from the secondary winding of phase shifter 44 through contacts of relay 46, resistors 38, grids 34, cathode 33 and a portion of resistor 28 to the secondary neutral point of phase shifter 44. Each grid functions as an anode, and each pair of grids connected with a secondary terminal of phase shifter 44 carries current through a portion of a cycle of the voltage of circuit 6 during which it is at a higher potential than the remaining pairs of grids.

Switch 18 may then be closed to connect transformer 16 with circuit 6. When the transformer is energized, the different phase portions of winding 19 bring the different pairs of anodes connected with windings 21, 22 and 23 sequentially to a potential higher than the potential of the remaining pairs of anodes and of cathode 33. Each anode however can begin to carry current only while the associated grid has a potential more positive than a predetermined critical potential approximating the potential of cathode 33. The variable potential components of the frequency of circuit 6 impressed on grids 34 from phase shifter 44 cause anodes 32 to carry current during variable portions of the voltage cycle of circuit 6. The anode currents therefore flow under variable voltages which may be taken as a measure of the conductivity of valves 27. Phase shifter 44 is so adjusted that each grid becomes more positive than cathode 33 toward the end of the positive half cycle of the potential impressed on the associated anode from winding 19. The different pairs of anodes sequentially carry current impulses which combine at cathode 33 to form a flow of pulsating current through resistor 28 and reactor 29 to the neutral point of winding 19. The adjustment of phase shifter 44 is so effected that the flow of current through valves 27 and intermediate circuit 26 to the exclusion of load circuit 7 is maintained at the proper value for maintaining the temperature of the different elements of valves 27 within the range insuring trouble-free operation of the valves during the conversion of current from circuit 6 to circuit 7.

The connection of the secondary neutral point of phase shifter 44 with the tap of resistor 28 causes the impression on grids 34 of the voltage drop in a portion of resistor 28 to thereby impart to the system a drooping characteristic and thereby limit the flow of current through circuit 26. During this operation each winding 21, 22, 23 serves to balance the currents of the anodes connected therewith without causing the appearance of substantial voltages in winding 25 and circuit 7. While such flow of current may be initiated when valves 27 are at temperatures below their normal operating range this initiation does not involve great difficulties as the transfer of current between anodes at the low frequency of circuit 6 in a current rectifying operation leave ample time for deionizing the space adjacent each anode at the end of each operating period thereof.

The flow of heating current through valves 27 and intermediate circuit 26 continues as long as circuit 7 remains unloaded. When switch 69 is closed, magnet valve 68 admits fluid under pressure from reservoir 67 to motor 66 and the motor moves billet 64 into inductive heating relation with coil 9. Toward the end of the stroke of motor 66 billet 64 urges thermocouple 73 toward the left, whereby the thermocouple is held in intimate contact with the billet. Relay 74 is thereby actuated to close contacts 74b and 74c. A circuit is thereby established from circuit 43 through switch 61, contact 61a, contacts 74c and the coil of switch 8 back to circuit 43. Switch 8 closes, thereby completing the inductive connection of circuit 7 with billet 64 constituting a load therefor. Relay 74 also opens contacts 74a, thereby deenergizing coil 57a. Relay 57 returns to the position shown and closes a circuit from circuit 43 through switch 61, contact 61a, contacts 74b, contacts 57d and coil 58a back to circuit 43. Relay 58 operates and connects coil 62a with circuit 43 through contacts 58b and 56b.

Relay 58 also connects coil 37a with circuit 43 through contacts 58b. Relay 37 first opens contacts 37b, thereby deenergizing coil 46a. Relay 46 immediately disconnects grids 34 from phase shifter 44. Grids 34 are then no longer impressed with potential and the flow of heating current through valves 27 is accordingly interrupted in response to loading of circuit 7. Relay 37 thereafter connects grids 34 in two groups of three with the secondary terminals of transformer 36, which is then unenergized.

Relay 58 also completes a circuit from rectifier 47 through contacts 58d, contacts 58c, resistor 53, coil 49a and contacts 49d back to the rectifier to energize coil 49a and charge capacitor 52. Relay 49 operates to open contacts 49d, but coil 49a remains momentarily energized by current supplied thereto from capacitor 52. Relay 49 also opens contacts 49b and closes contacts 49c to substitute the voltage drop in a portion of resistor 28 and a positive potential from voltage divider 48 for the negative potential previously impressed on grids 34 from voltage divider 48.

The grids accordingly release the flow of current through all valves 27 and circuit 26 at the full voltage of winding 19 in response to loading of circuit 7. The valves operate sequentially in pairs to carry large pulsating currents which combine at cathode 33 to flow as a pulsating unidirectional current through resistor 28 and reactor 29. The current in circuit 26 however does not reach immediately its steady state value because of the inductance of reactor 29, and its average value increases gradually. The voltage drop produced by the flow of this current in resistor 28 is pulsating and of increasing magnitude, and a portion of this voltage drop is impressed in the negative sense on the circuits of grids 34.

The voltage drop so impressed on grids 34 periodically becomes lower than the positive potential component impressed thereon from voltage divider 48, whereby each valve 27 is rendered conductive only toward the end of the half cycle of the voltage impressed thereon from winding 19, commutation takes place with a considerable discontinuity in the voltage of circuit 26, and the average intensity of the current of circuit 26 is limited to a predetermined value. The flow of current through each valve accordingly takes place in impulses in response to the sudden impression of a positive potential on the grids by operation of relay 49 for rendering the valves conductive and to the transfer of current from one valve to another under an abrupt change in voltage.

While the detailed action of such current impulses has not been observed and is not known, experiments have shown that when the current impulses exceed a magnitude depending on the characteristics of the elements of the system, the impulses result in the intermittent appearance of substantial transient voltages in windings 21, 22 and 23 and in the impression of corresponding voltages on circuit 7 through winding 25. Any transient voltage impressed on capacitor 11 results in the capacitor becoming charged with stored energy and, upon disappearance of the transient voltage, the capacitor discharges in an oscillatory manner through coil 9 and winding 25 with a frequency of oscillation which is of the order of magnitude of the normal operating frequency of circuit 7.

If these transient oscillations exceed a predetermined magnitude, capacitor 11 supplies to winding 25 sufficient energy to cause commutation between the anodes connected with the two ends of one of windings 21, 22 and 23. At the same time these oscillations result in the selective impression on the two groups of grids 34 of potential components of the same frequency and of proper phase from circuit 7 through capacitor 39, resistor 41, contacts 57c, transformer 36 and the contacts of relay 37. Normal operation of converter 5 for the transfer of energy from circuit 6 to circuit 7 is thereby established, the different valves 27 being rendered conductive in sequence by the joint action of the positive potential component impressed on grids 34 from voltage divider 48 and of the alternating potential components impressed on the grids from transformer 36 to convert the current supplied thereto from winding 19 into current impulses supplied sequentially to the different portions of windings 21, 22 and 23 as is well known.

During the above described starting operation, relay 62 is energized from circuit 43 through contacts 58b, 56b. If normal operation of converter 5 is established within a time shorter than the operating time of relay 62, transformer 36 is energized at the frequency of circuit 7 and current flows from transformer 36 through the contacts of relay 37, resistors 38, grids 34, cathode 33, resistor 28, contacts 49c, voltage divider 48 and coil 56a back to transformer 36. Relay 56 then operates to open contacts 56b, thereby deenergizing relay 62 which returns to the position shown without closing contacts 62b. Relay 56 also closes contacts 56c, thereby connecting coil 30a with rectifier 47 to cause switch 30 to short circuit resistor 28. Relay 56 further opens contacts 56d inserted in the connections between coil 49a and rectifier 47, and relay 49 returns to the position shown when the current supplied to coil 49a by capacitor 52 has decreased to a sufficient extent.

Return of relay 49 to the position shown removes from the grid circuits the pulsating voltage drop in a portion of resistor 28 and the positive potential component impressed on the grids from voltage divider 48. Closure of contacts 49b substitutes for this positive potential component a negative potential component from voltage divider 48, which cooperates with the alternating potential components impressed on the grids from transformer 36 for decreasing the conductivity of valves 27 during normal operation of the converter. Resistor 51 is provided to prevent opening of the grid circuits during return of relay 49 to the position shown.

If relay 49 returns to the position shown before normal operation of converter 5 is established, the flow of current through valves 27 is interrupted by reapplication of a negative potential component on grids 34 and coil 49a is reenergized by closure of contacts 49d to cause relay 49 to initiate another series of current impulses through valves 27 in the manner above set forth. Initiation of the operation of the converter is thereby established more readily than if an uninterrupted series of impulses were supplied to valves 27.

If the starting operation is unsuccessful or requires such a length of time that relay 62 closes contacts 62b before relay 56 operates, alarm device 63 and trip coil 18a are energized and switch 18 disconnects transformer 16 from circuit 6 so as to permit investigation of the cause of failure of the system to operate.

If during normal operation of converter 5, the flow of current therethrough is interrupted for any reason, transformer 36 is deenergized and relay 56 returns to the position shown, thereby causing relay 49 to operate in the manner above set forth to reinitiate the operation of the converter.

During normal operation of the converter, winding 25 supplies to coil 9 current of relatively high frequency serving to heat billet 64 by induction of current therein. If billet 76 is then inserted in coil 13 in heating relation therewith so as to actuate relay 78, load switch 12 closes to cause winding 25 to supply current to coil 13 to heat billet 76 by induction of current therein. Actuation of relay 78 by billet 76 while relay 74 is maintained in the actuated position by billet 64 has no effect on the operation of the converter.

When billet 64, for example, reaches the desired temperature for which relay 75 is adjusted, the relay connects the coil of magnet valve 71 with circuit 43. The magnet valve admits fluid under pressure from reservoir 67 to motor 66, which moves billet 64 out of heating relation with coil 9. During the movement of billet 64 the billet ceases to engage thermocouple 73, which returns to ambient temperature. The time delay element of relay 75 causes magnet valve 71 to remain actuated during a sufficient length of time to insure completion of the stroke of motor 66.

Thermocouple 73 and relay 74 return to the position shown to cause switch 8 to open without otherwise affecting the operation of the system as long as another billet remains in heating position in one of the inductor coils. If all the billets are simultaneously withdrawn from the inductor coils, relays 74, 78 and any other similar relays causes all the load switches to open, relays 56, 58 and 37 to return to the position shown and relays 46 and 57 to operate to stop the normal operation of converter 5 and reestablish the heating operation of valves 27 above described. The relays interlock the grid energizing means for controlling the conductivity of valves 27 for the flow of heating current through circuit 26 and the grid energizing means for controlling the transfer of energy from circuit 6 to circuit 7 to prevent simultaneous operation thereof.

If switch 61 is returned to the position shown in engagement with contact 61b, relays 37, 46, 49, 56, 58 are returned or maintained in the position shown. Coil 57a is again energized and relay 57 operates to short circuit the primary winding of transformer 36 through contacts 57b, thereby immediately deenergizing transformer 36 regardless of the energization of circuit 7 to stop the operation of the converter.

If switch 61 is moved to engage contacts 61c a permanent connection is established therethrough between circuit 43 and coil 58a. Relay 58 then establishes the connections for starting and maintaining the operation of the converter for the conversion of energy from circuit 6 to circuit 7 in the manner above set forth.

If switch 61 is moved to engage contact 61d a permanent connection is established therethrough between circuit 43 and coil 46a. Relay 46 connects grids 34 with phase shifter 44 to establish the flow of heating current through valves 27 in the manner above set forth.

Figure 2:
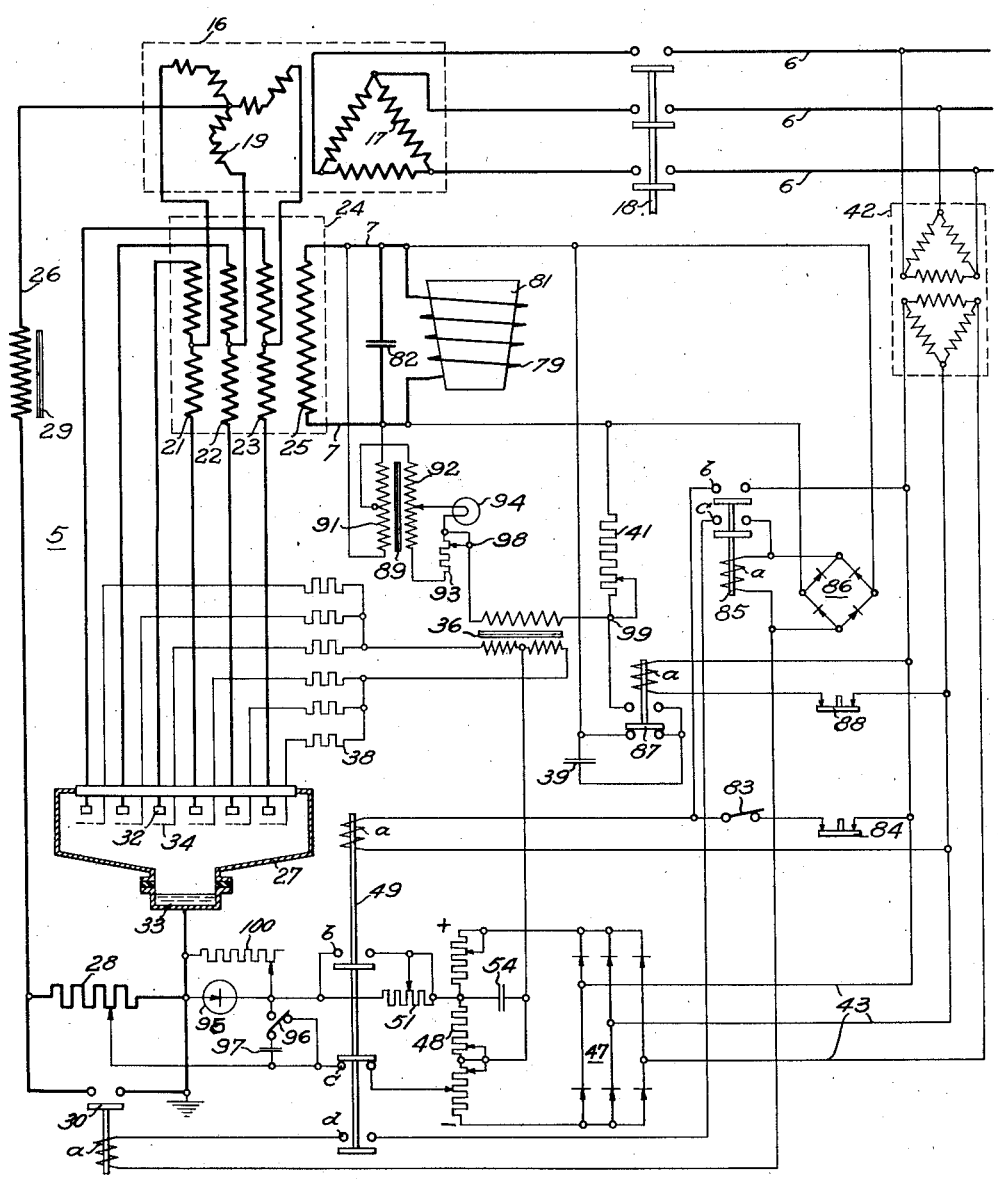
Fig. 2 is a connection diagram of another embodiment of the present invention generally similar to the embodiment illustrated in Fig. 1 adapted for the melting of metals by induction heating under manual control.

In the embodiment illustrated in Fig. 2 circuit 7 is permanently connected with an inductor coil 79 in inductive relation with a crucible 81 and connected in parallel with a capacitor 82 of sufficient capacitance to impart to circuit 7 a capacitive character. Coil 49a is connected with circuit 43 through a knife blade switch 83 in series with a push-button switch 84, and may also be connected with circuit 43 through contacts 85b of a relay 85 having its coil 85a energized from circuit 7 through a rectifier 86. Capacitor 39 may be connected with resistor 41 or short circuited by a relay 87 having the coil 87a thereof connected with circuit 43 through a push-button switch 88.

Transformer 36 is connected with circuit 7 through a transformer 89 comprising a tapped primary winding 91 and a tapped secondary winding 92, a resistor 93 operating at a relatively low temperature so as to have a substantially constant resistance, and a resistor 94 such as a metallic filament lamp operating at a relatively high temperature whereby the resistance thereof is higher in the course of normal operation than at the moment of initiation of such operation. Resistor 51 may be connected with cathode 33 through a rectifier 95 bridged by a resistor 100 and with the tap of resistor 28 through a switch 96 and a capacitor 97.

The starting and normal operations of the current converting system of the present embodiment are substantially the same as those of the embodiment illustrated in Fig. 1 and therefore will not be considered in detail. It will be assumed however that the converter is to be started under no load conditions or with crucible 81 containing unmelted material forming a relatively small load so that a preliminary warming up of valves 27 by the flow of current through intermediate circuit 26 to the exclusion of the load circuit is unnecessary.

In operation, the elements of the system being as shown on the drawing, energization of circuit 6 causes circuit 43 to supply current to voltage divider 48 through rectifier 47. Coil 49a is energized from circuit 43 and relay 49 operates to impress on grids 34 a negative potential from voltage divider 48. Coil 87a is also energized and relay 87 connects capacitor 39 across circuit 7 through resistor 41. Upon switch 18 being closed and the emissive condition of cathode 33 being established, the operation of the converter may be initiated by opening switch 83 to deenergize coil 49a. Relay 49 returns to the position shown, thereby causing impression of a positive potential from voltage divider 48 on all grids 34. Valves 27 are thereby caused to carry current impulses which are controlled as above set forth in response to the flow thereof through resistor 28 by the impression on grids 34 of the voltage drop of a portion of the resistor.

If capacitor 97 is connected with rectifier 95 through switch 96, the capacitor becomes charged at the peak value of the voltage drop in a portion of resistor 28, which is proportional to the peak value of the current through valves 27. The voltage of capacitor 97 appears in the circuits of grids 34 as a negative potential component maintaining valves 27 nonconductive for a length of time depending upon the rate of discharge of capacitor 97 through resistors 100 and 28. Capacitor 97 is thus alternately charged and discharged to cause the flow of current through circuit 26 to be periodically interrupted. The current impulses through windings 21, 22, 23 induce in circuit 7 transient currents which store in capacitor 82 sufficient energy to effect commutation between anodes 32 and energize transformer 36 to control the commutation between anode currents.

When normal current converting operation is so established in the converter, circuit 7 energizes coil 85a and relay 85 closes its contacts. Contacts 85b reconnect coil 49a with circuit 43 to cause relay 49 to remove from grids 34 the positive potential component from voltage divider 48 and to substitute therefor a negative potential component. Contacts 85c and 49d connect coil 30a with rectifier 86, and switch 30 short circuits resistor 28.

The flow of current through the converter varies in dependence upon the size, the nature and the temperature of the charge of crucible 81, which affects the inductance of coil 79 and the loading of circuit 7. As a result of the energization of transformer 36 from circuit 7 the output voltage and frequency of converter 5 are also affected by the loading conditions of circuit 7. At low loads the operating frequency of circuit 7 is relatively low and its voltage tends to be relatively high, while at high loads the frequency of circuit 7 increases and the voltage thereof decreases. The magnitude of the voltage of circuit 7 may however be controlled by adjusting the magnitude of the unidirectional potential component impressed on the grids from voltage divider 48 and the magnitude and phase of the alternating component impressed on the grids from transformer 36.

Figure 3:
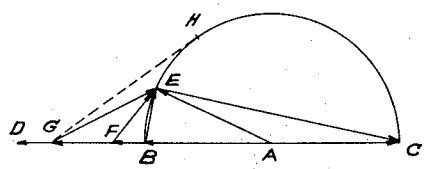
Fig. 3 is a vector diagram of some of the voltages involved in the embodiment illustrated in Fig. 2.

Fig. 3 shows the different voltages involved in the operation of transformer 36. In this figure point A represents the potential of the midtap of winding 91. Vector AB represents the voltage of one-half of winding 91 taken as reference, which is equal to one-half of the voltage of circuit 7 represented by vector BC. The voltage of winding 92 is represented by vector AD in phase with vector AB but of greater magnitude. Vector BE represents the voltage across resistor 41 and vector EC the voltage across capacitor 39 when the voltage of circuit 7 has the magnitude BC and a relatively low frequency corresponding to a low loading of circuit 7.

Point 98 at the juncture of resistor 93 with lamp 94 has a potential which is intermediate the potentials represented by points A and D. At the moment of initiation of the flow of current through valves 27, lamp 94 is at ambient temperature and its resistance is relatively low. The potential of point 98 may then be represented by point F, which is relatively close to point B while the potential of point 99 at the juncture of capacitor 39 with resistor 41 is represented by point E. The primary voltage of transformer 26 is then represented by vector FE which is the resultant of two components. One component is vector AF, greater than vector AB in phase therewith and representing the voltage between point 98 and the midtap of winding 91. The other component is vector AE equal to vector AB but shifted in phase with respect thereto and representing the voltage between point 99 and the midtap of winding 91. Vector FE leads vector BC by a considerable angle, thereby indicating that valves 27 are rendered conductive at a relatively early part of the voltage cycle of circuit 7 whereby initiation of the operation of the valves is facilitated. A short time after energization of circuit 7 lamp 94 reaches operating temperature, whereby the resistance of the lamp increases and the potential of point 98 is modified to a value represented by point G. The primary voltage of transformer 36 is then represented by vector GE. The conductivity of the valves is thereby decreased, with the result that the danger of disturbances in the operation of the converter at relatively high loads is diminished.

When the frequency of the voltage of circuit 7 increases as a result of increased loading of circuit 7 the impedance of capacitor 39 decreases and point E shifts accordingly on half circle BEC in the clockwise direction. Shifting of point E to point H, from which point G is viewed tangentially to the circle, causes vector GE to swing in the counterclockwise direction, i. e. forward, although vectors BE, EC and AE all swing in the clockwise direction, i. e. backward. Further shift of point E past point H causes vector GE to swing back in the clockwise direction. If point E reaches point H at full load, the voltage of transformer 36 represented by vector GE shifts gradually forward from no load to full load. The conductivity of valves 27 is thereby gradually increased, with the result that the system is imparted a rising volt-ampere characteristic. If point E reaches point H at some intermediary value of load the characteristic is rising only up to that load and becomes drooping at higher loads.

If the flow of current through valves 27 ceases for any reason, circuit 7 is deenergized and relay 85 returns to the position shown, thereby also returning relay 49 and switch 39 into the positions shown. Relay 49 again impresses a positive potential on grids 34 in the manner above set forth to reinitiate immediately the operation of the converter. If it is not desired that such reinitiation take place the converter is started by momentarily opening push-button switch 84 and leaving switch 83 closed so that upon release of push button switch 84 coil 49a remains permanently energized.

To stop the operation of the converter, push-button switch 83 is opened momentarily to deenergize coil 87a. Relay 87 disconnects capacitor 39 from resistor 41 and from grid transformer 36 and short circuits the capacitor. The voltage of transformer 36 is thereby shifted into phase coincidence with the voltage of circuit 7 to prevent further commutation of the current between valves 27, with the result that the converter ceases to operate. Operation may then be resumed by actuating switch 83 or push-button switch 84 as above set forth.

Figure 4:
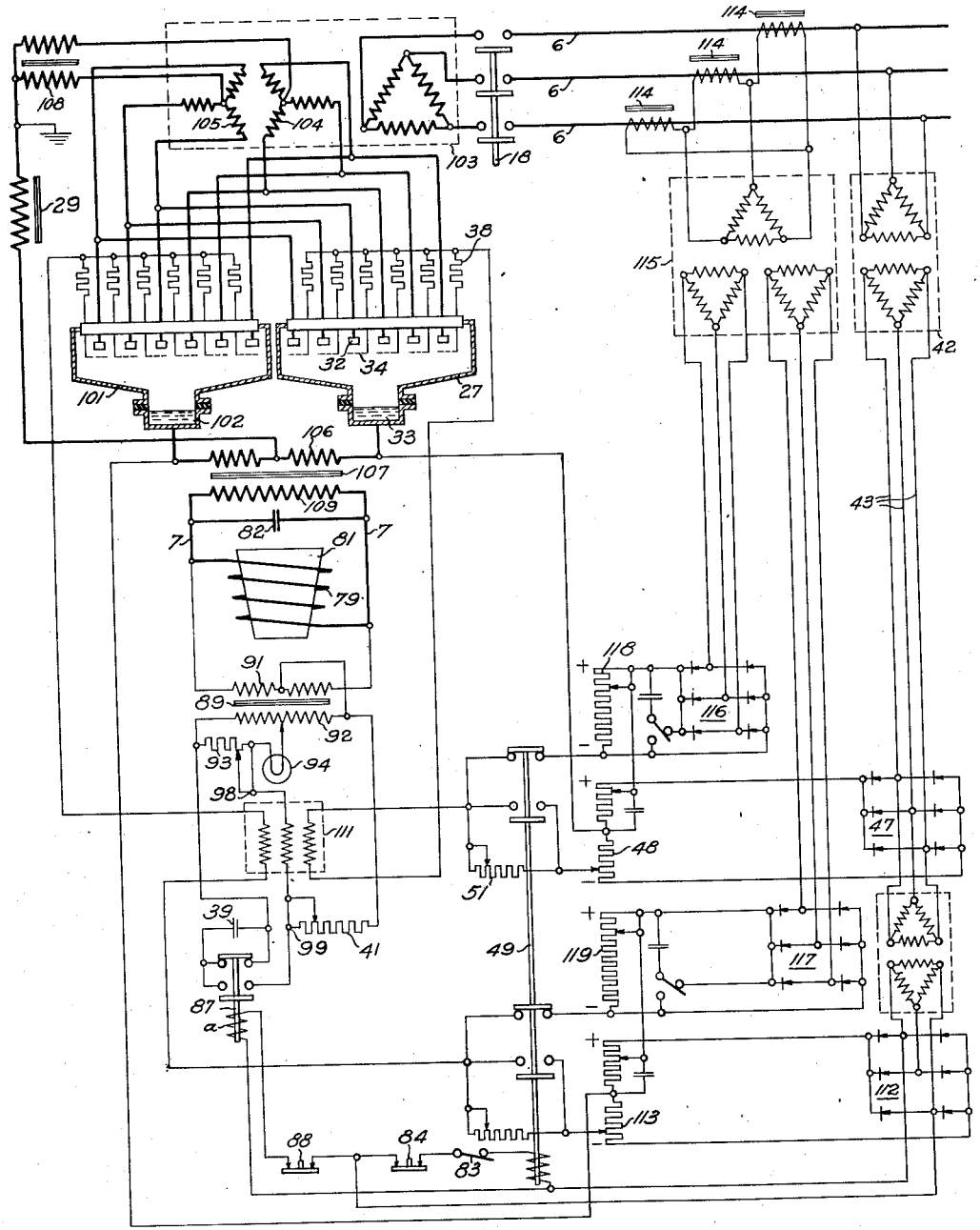
Fig. 4 is a connection diagram of another embodiment of the present invention applied to another type of valve converter and utilizing auxiliary rectifying devices for energizing the control electrodes of the valves.

In the embodiment illustrated in Fig. 4 circuit 7 is assumed to require more electrical energy than can be converted through valves 27 alone. Valves 27 are accordingly associated with a second group of valves 101 having a cathode 102. The anodes of the two groups of valves are connected with circuit 6 through switch 18 and a transformer 103 comprising two secondary windings 104, 105. Cathodes 33 and 102 are connected with the neutral points of windings 104, 105 through the primary winding 106 of an output transformer 107, reactor 29 and an interphase transformer 108.

The secondary winding 109 of transformer 107 is connected with circuit 7. As cathodes 33 and 102 are at different potentials grid transformer 36 of the embodiments illustrated in Figs. 1 and 2 must be replaced by a transformer 111 having two separate secondary windings but otherwise functioning in the same manner as transformer 36. For the same reason rectifier 47 and voltage divider 48 are connected only with the grids of valves 27, a second rectifier 112 and a second voltage divider 113 being provided for the control of the grids of valves 101 through additional contacts of relay 49.

Resistor 28 may be omitted, but control voltages similar to the voltage drop in resistor 28 may be obtained in response to the flow of pulsating current through valves 27 from current transformers 114; a three winding transformer 115, rectifiers 116, 117 and resistors 118, 119. These control voltages are supplied to the grid circuits of valves 27, 101 to control the flow of starting current impulses through the intermediate circuit comprising windings 104, 105, valves 27 and 101, winding 106, reactor 29 and interphase transformer 108. This flow of current takes place substantially in the manner above set forth with respect to the embodiment illustrated in Figs. 1 and 2.

Although but a few embodiments of the present invention have been illustrated and described, it will be apparent to those skilled in the art that various changes and modifications may be made therein without departing from the spirit of the invention or from the scope of the appended claims. Features disclosed but not claimed herein are claimed in an application of L. L. Johnson, Serial No. 561,951, filed November 4, 1944.

It is claimed and desired to secure by Letters Patent:

1. In combination, an alternating current supply circuit, an alternating current load circuit, a current converting system interconnecting said circuits comprising a plurality of electric valves, said valves comprising a plurality of control electrodes and at least one cathode, a resistor connected with said cathode, a source of positive potential component connected with said resistor and with said control electrodes to cause the flow of pulsating currents through said valves and through said resistor for initiating transient currents in said load circuit, means connecting said resistor with said control electrodes for impressing on said control electrodes a pulsating negative potential component from said resistor for controlling the conductivity of said valves, means connecting said control electrodes with said load circuit for selectively impressing alternating potentials on said control electrodes in response to said transient currents for rendering said valves conductive in sequence to initiate the supply of alternating current from said supply circuit to said load circuit through said system, relay means response to energization of said load circuit for substituting a negative potential for said positive potential, and means responsive to operation of said relay means for short circuiting said resistor.

2. In combination, an alternating current supply circuit, an alternating current load circuit, a current converting system interconnecting said circuits comprising a plurality of electric valves, means for rendering all said valves conductive to cause the flow of pulsating currents through said valves for initiating transient currents in said load circuit, means responsive to said pulsating currents for controlling the conductivity of said valves to limit the flow of current therethrough, means responsive to said transient currents for rendering said valves conductive in sequence to initiate the supply of alternating current from said supply circuit to said load circuit through said system, relay means responsive to energization of said load circuit for rendering ineffective the said means for rendering all said valves conductive, and means responsive to operation of said relay means for rendering ineffective the said means for controlling the conductivity of said valves.

3. In combination, an alternating current supply circuit, an alternating current load circuit, a current converting system interconnecting said circuits comprising a plurality of electric valves, said valves comprising a plurality of control electrodes and at least one cathode, a resistor connected with said cathode, a source of positive potential component connected with said resistor and with said control electrodes to cause the flow of pulsating currents through said valves and through said resistor for initiating transient currents in said load circuit, means connecting said resistor with said control electrodes for impressing on said control electrodes a pulsating negative potential component from said resistor for controlling the conductivity of said valves, means connecting said control electrodes with said load circuit for selectively impressing alternating potentials on said control electrodes in response to said transient currents for rendering said valves conductive in sequence to initiate the supply of alternating current from said supply circuit to said load circuit through said system, and means responsive to energization of said load circuit for rendering ineffective the said source of positive potential and for short circuiting said resistor.

4. In combination, an alternating current supply circuit, an alternating current load circuit, a current converting system interconnecting said circuits comprising a plurality of electric valves, said valves comprising a plurality of control electrodes, a source of positive potential connected with said control electrodes to cause the flow of pulsating currents through said valves for initiating transient currents in said load circuit, means responsive to said pulsating currents for impressing on said control electrodes a pulsating negative potential for controlling the conductivity of said valves, means connecting said control electrodes with said load circuit for selectively impressing alternating potentials on said control electrodes in response to said transient currents for rendering said valves conductive in sequence to initiate the supply of alternating current from said supply circuit to said load circuit through said system, and means responsive to energization of said load circuit for rendering ineffective the said source of positive potential and the said means for impressing on said control electrodes a pulsating negative potential.

5. In combination, an alternating current supply circuit, an alternating current load circuit, a current converting system interconnecting said circuits comprising a plurality of electric valves, means for rendering all said valves conductive to cause the flow of pulsating currents through said valves for initiating transient currents in said load circuit, means responsive to said pulsating currents for controlling the conductivity of said valves to limit the flow of current therethrough, means responsive to said transient currents for rendering said valves conductive in sequence to initiate the supply of alternating current from said supply circuit to said load circuit through said system, and means responsive to energization of said load circuit for rendering ineffective the said means for rendering all said valves conductive and the said means for controlling the conductivity of said valves.

6. In combination, an alternating current supply circuit, an alternating current load circuit, a current converting system interconnecting said circuits comprising a plurality of electric valves, said valves comprising a plurality of control electrodes, a source of positive potential connected with said control electrodes to cause the flow of pulsating currents through said valves for initiating transient currents in said load circuit, means responsive to said pulsating currents for impressing on said control electrodes a pulsating negative potential for controlling the conductivity of said valves, means connecting said control electrodes with said load circuit for selectively impressing alternating potentials on said control electrodes in response to said transient currents for rendering said valves conductive in sequence to initiate the supply of alternating current from said supply circuit to said load circuit through said system, and means responsive to energization of said load circuit for substituting a negative potential for said positive potential.

7. In combination, an alternating current supply circuit, an alternating current load circuit, a current converting system interconnecting said circuits comprising a plurality of electric valves, said valves comprising a plurality of control electrodes, a source of positive potential connected with said control electrodes to cause the flow of pulsating currents through said valves for initiating transient currents in said load circuit, means responsive to said pulsating currents for impressing on said control electrodes a pulsating negative potential for controlling the conductivity of said valves, means connecting said control electrodes with said load circuit for selectively impressing alternating potentials on said control electrodes in response to said transient currents for rendering said valves conductive in sequence to initiate the supply of alternating current from said supply circuit to said load circuit through said system, and means responsive to energization of said load circuit for rendering ineffective the said source of positive potential.

8. In combination, an alternating current supply circuit, an alternating current load circuit, a current converting system interconnecting said circuits comprising a plurality of electric valves, means for rendering all said valves conductive to cause the flow of pulsating currents through said valves for initiating transient currents in said load circuit, means responsive to said pulsating currents for controlling the conductivity of said valves to limit the flow of current therethrough, means responsive to said transient currents for rendering said valves conductive in sequence to initiate the supply of alternating current from said supply circuit to said load circuit through said system, and means responsive to energization of said load circuit for rendering ineffective the said means for rendering all said valves conductive.

9. In combination, an alternating current supply circuit, an alternating current load circuit, a current converting system interconnecting said circuits comprising a plurality of electric valves, said valves comprising a plurality of control electrodes, a source of positive potential connected with said control electrodes to cause the flow of pulsating currents through said valves for initiating transient currents in said load circuit, means comprising a current transformer connected in said supply circuit and a rectifying device operable responsive to said pulsating currents for impressing on said control electrodes a pulsating negative potential for controlling the conductivity of said valves, and means connecting said control electrodes with said load circuit for selectively impressing alternating potentials on said control electrodes in response to said transient currents for rendering said valves conductive in sequence to initiate the supply of alternating current from said supply circuit to said load circuit through said system.

10. In combination, an alternating current supply circuit, an alternating current load circuit, a current converting system interconnecting said circuits comprising a plurality of electric valves, said valves comprising a plurality of control electrodes and at least one cathode, a resistor connected with said cathode, a source of positive potential component connected with said resistor and with said control electrodes to cause the flow of pulsating currents through said valves and through said resistor for initiating transient currents in said load circuit, means connecting said resistor with said control electrodes for impressing on said control electrodes a pulsating negative potential component from said resistor for controlling the conductivity of said valves, and means connecting said control electrodes with said load circuit for selectively impressing alternating potentials on said control electrodes in response to said transient currents for rendering said valves conductive in sequence to initiate the supply of alternating current from said supply circuit to said load circuit through said system.

11. In combination, an alternating current supply circuit, an alternating current load circuit, a current converting system interconnecting said circuits comprising a plurality of electric valves, said valves comprising a plurality of control electrodes, a source of positive potential connected with said control electrodes to cause the flow of pulsating currents through said valves for initiating transient currents in said load circuit, means responsive to said pulsating currents for impressing on said control electrodes a pulsating negative potential for controlling the conductivity of said valves, and means connecting said control electrodes with said load circuit for selectively impressing alternating potentials on said control electrodes in response to said transient currents for rendering said valves conductive in sequence to initiate the supply of alternating current from said supply circuit to said load circuit through said system.

12. In combination, an alternating current supply circuit, an alternating current load circuit, a current converting system interconnecting said circuits comprising a plurality of electric valves, means for rendering all said valves conductive to cause the flow of pulsating currents through said valves for initiating transient currents in said load circuit, means responsive to said pulsating currents for controlling the conductivity of said valves to limit the flow of current therethrough, and means responsive to said transient currents for rendering said valves conductive in sequence to initiate the supply of alternating current from said supply circuit to said load circuit through said system.

13. In combination, an alternating current supply circuit, an alternating current load circuit, a current converting system interconnecting said circuits comprising an electric valve, and means for initiating operation of said system comprising means responsive to interruption of the flow of current between said circuits for rendering said valve conductive in such manner as to cause the flow of pulsating currents through said valve for initiating transient currents in said load circuit and means responsive to said transient currents for rendering said valve conductive in such manner as to initiate the supply of alternating current from said supply circuit to said load circuit through said system.

14. In combination, an alternating current supply circuit, an alternating current load circuit, a current converting system interconnecting said circuits comprising an electric valve, and means for initiating operation of said system comprising means responsive to loading of said load circuit for rendering said valve conductive in such manner as to cause the flow of pulsating currents through said valve for initiating transient currents in said load circuit and means responsive to said transient currents for rendering said valve conductive in such manner as to initiate the supply of alternating current from said supply circuit to said load circuit through said system.

15. In combination, an alternating current supply circuit, an alternating current load circuit, a current converting system interconnecting said circuits comprising an electric valve, and means for initiating operation of said system comprising means for rendering said valve conductive in such manner as to cause the flow of pulsating currents through said valve for initiating transient currents in said load circuit and means responsive to said transient currents for rendering said valve conductive in such manner as to initiate the supply of alternating current from said supply circuit to said load circuit through said system.

16. In combination, an electric current supply circuit, an electric current load circuit, one of said circuits being an alternating current circuit operating at variable frequency, a current converting system interconnecting said circuits comprising an electric valve, and means for controlling the conductivity of said valve including means responsive to energization of said load circuit for decreasing the conductivity of said valve.

17. In combination, an alternating current supply circuit, an alternating current load circuit, a current converting system interconnecting said circuits comprising an electric valve, and means for initiating operation of said system comprising means for rendering said valve conductive in such manner as to cause the flow of pulsating currents through said valve for initiating transient currents in said load circuit and means responsive to said transient currents for rendering said valve conductive in such manner as to initiate the supply of alternating current from said supply circuit to said load circuit through said system, and the time delay means responsive to failure of initiating operation of said system for disconnecting said system from said supply circuit.

18. The method of initiating the flow of current from an alternating current supply circuit to an alternating current load circuit through an electric valve comprising the steps of rendering the valve conductive in such manner as to cause the flow of pulsating current therethrough, controlling the conductivity of the valve in such manner as to limit the magnitude of said pulsating current, initiating transient currents in said load circuit in accordance with said pulsating currents, and controlling the conductivity of the valve in accordance with the transient currents.

19. The method of initiating the flow of current from an alternating current supply circuit to an alternating current load circuit through an electric valve comprising the steps of rendering the valve conductive in such manner as to cause the flow of pulsating current therethrough, initiating transient currents in said load circuit in accordance with said pulsating currents, and controlling the conductivity of the valve in accordance with the transient currents.

20. In combination, an alternating current supply circuit, an alternating current load circuit, an intermediate circuit comprising an electric valve connected with said supply and load circuits for the transfer of energy therebetween, and means for controlling the temperature of said valve comprising means for controlling the conductivity of said valve to cause the flow of current supplied from said supply circuit through said intermediate circuit and through said valve to the exclusion of said load circuit, and means responsive to loading of said load circuit for rendering said valve temperature controlling means inoperative and for controlling the conductivity of said valve to control the transfer of energy from said supply circuit to said load circuit.

21. In combination, an alternating current supply circuit operating at a predetermined frequency, an alternating current load circuit to operate at a frequency different from said supply circuit frequency, an intermediate circuit comprising an electric valve connected with said supply and load circuits, means comprising a source of potential of said load circuit frequency for controlling the conductivity of said valve to control the transfer of energy from said supply circuit to said load circuit by way of said intermediate circuit, means comprising a source of potential of said supply frequency for controlling the conductivity of said valve to control the flow of current from said supply circuit to said intermediate circuit to the exclusion of said load circuit for controlling the temperature of said valve, and an interlock between the first and second said means to prevent simultaneous operation thereof.

22. In combination, an alternating current supply circuit, an alternating current load circuit, an intermediate circuit comprising an electric valve connected with said supply and load circuits, means for controlling the conductivity of said valve for controlling the transfer of energy from said supply circuit to said load circuit by way of said intermediate circuit, means for controlling the conductivity of said valve to control the flow of current from said supply circuit to said intermediate circuit to the exclusion of said load circuit for controlling the temperature of said valve, and an interlock between the first and second said means to prevent simultaneous operation thereof.

23. In combination, an alternating current supply circuit, an alternating current load circuit, an intermediate circuit comprising an electric valve connected with said supply and load circuits for the transfer of energy therebetween, and means for controlling the temperature of said valve comprising means for controlling the conductivity of said valve to cause the flow of current supplied from said supply circuit through said intermediate circuit and through said valve to the exclusion of said load circuit.

24. In combination, an electric current supply circuit, an alternating current load circuit, a current converting system interconnecting said circuits comprising a plurality of electric valves having control electrodes, a resistor and a capacitor serially connected across said load circuit, a control electrode energizing circuit connected with the point of juncture of said resistor with said capacitor, and means for stopping the operation of said system comprising means for disconnecting said capacitor from said resistor and from said control electrode energizing circuit.

25. In combination, a source of alternating current, an electric valve connected in circuit with said source and provided with a control electrode, and means for causing said valve to carry a discontinuous pulsating current comprising a source of positive potential connected with said control electrode to render said valve conductive, a capacitor, means comprising a rectifying device for charging said capacitor to a voltage proportional to the peak value of the current through said valve, means for impressing on said control electrode a negative potential component from said capacitor to render said valve nonconductive, and means for discharging said capacitor to return said valve to conductive condition.

26. In combination, a source of alternating current, an electric valve connected in circuit with said source, and means for controlling the conductivity of said valve comprising a capacitor, means for charging said capacitor to a voltage proportional to the peak value of the current through said valve, and means for controlling the discharge of said capacitor.

27. In combination, an electric current supply circuit, an electric current load circuit, one of said circuits being an alternating current circuit operating at variable frequency, a current converting system interconnecting said circuits comprising an electric valve having a control electrode, means for energizing said control electrode comprising a phase shifting circuit connected with said alternating current circuit, and connections between said control electrode and said phase shifting circuit for causing the potential impressed on said control electrode to shift forward when the frequency of said alternating current increases.

28. In combination, an electric current supply circuit, an electric current load circuit, one of said circuits being an alternating current circuit operating at variable frequency, a current converting system interconnecting said circuits comprising an electric valve having a control electrode, means for energizing said control electrode comprising a phase shifting circuit connected with said alternating current circuit for impressing on said control electrode a potential component not greater than one half of the voltage of said alternating current circuit and displaced in phase with respect thereto, and means for impressing on said control electrode a second potential component greater than one half of the voltage of said alternating current circuit and substantially in phase coincidence therewith.

29. In combination, an electric current supply circuit, an electric current load circuit, one of said circuits being an alternating current circuit operating at variable frequency, a current converting system interconnecting said circuits comprising an electric valve, and means responsive to increase in the frequency of said alternating current circuit for increasing the conductivity of said valve.

LAUREN L. JOHNSON.

REFERENCES CITED

The following references are of record in the file of this patent:

UNITED STATES PATENTS

| Number | Name | Date |
|---|---|---|
| 2,147,474 | Wagner et al. | Feb. 14, 1939 |
| 1,926,275 | Fitzgerald | Sept. 12, 1933 |